(12) United States Patent
Wang

(10) Patent No.: US 7,996,133 B2
(45) Date of Patent: Aug. 9, 2011

(54) TIME DILATION FORMULAS, ALGORITHMS AND APPLICATIONS

(75) Inventor: Jenne-Tai Wang, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 279 days.

(21) Appl. No.: 12/466,756

(22) Filed: May 15, 2009

(65) Prior Publication Data

US 2009/0326766 A1    Dec. 31, 2009

Related U.S. Application Data

(60) Provisional application No. 61/076,047, filed on Jun. 26, 2008.

(51) Int. Cl.
*B60R 22/00* (2006.01)
(52) U.S. Cl. ............................ 701/46; 701/45
(58) Field of Classification Search ................... 280/735; 701/45, 46
See application file for complete search history.

(56) References Cited

U.S. PATENT DOCUMENTS

| | | | | |
|---|---|---|---|---|
| 7,472,007 B2 * | 12/2008 | Kong et al. | ...... | 701/45 |
| 7,505,841 B2 * | 3/2009 | Sun et al. | ...... | 701/45 |
| 7,613,568 B2 * | 11/2009 | Kawasaki | ...... | 701/301 |
| 7,636,625 B2 * | 12/2009 | Weber et al. | ...... | 701/45 |
| 7,689,359 B2 * | 3/2010 | Tokoro et al. | ...... | 701/301 |
| 7,866,427 B2 * | 1/2011 | Zagorski | ...... | 180/167 |
| 7,905,313 B2 * | 3/2011 | Odate et al. | ...... | 180/268 |
| 7,908,058 B2 * | 3/2011 | Takemura | ...... | 701/45 |
| 2007/0192030 A1 | 8/2007 | Tanimichi et al. | | |
| 2008/0040004 A1 | 2/2008 | Breed | | |
| 2008/0077296 A1 | 3/2008 | Kawasaki | | |

* cited by examiner

*Primary Examiner* — Toan C To
(74) *Attorney, Agent, or Firm* — John A. Miller; Miller IP Group, PLC

(57) ABSTRACT

An algorithm that is part of a collision preparation system that provides selective and limited vehicle braking to avoid undesirable intrusive high-G braking while still giving the system adequate time to activate collision mitigation devices on the vehicle before impact with an object. If a predicted time to collision between the vehicle and the object is less than a required time to collision, which is determined by how much time is necessary for a certain collision mitigation device to be activated, the algorithm calculates a time dilation deceleration. The system causes the vehicle to automatically brake to decelerate the vehicle at the time dilation deceleration until the time dilation deceleration reaches a predetermined decelerating threshold so that more time is available for the collision preparation system to determine whether to activate the collision mitigation device.

22 Claims, 10 Drawing Sheets

TIME DILATION FORMULAS, ALGORITHMS AND APPLICATIONS

CROSS-REFERENCE TO RELATED APPLICATIONS

This application claims the benefit of the filing date of U.S. Provisional Application Ser. No. 61/076,047, titled Time Dilation Formulas, Algorithms and Applications, filed Jun. 26, 2008.

BACKGROUND OF THE INVENTION

1. Field of the Invention

This invention relates generally to a system and method for increasing the time that the system has to react to detecting an object and, more particularly, to a system and method for providing time dilation so as to allow a pre-collision sensing system on a vehicle to detect an object in front of the vehicle with enough time to deploy collision preparation safety devices.

2. Discussion of the Related Art

Vehicle manufacturers are continually trying to improve vehicle safety for both vehicle occupants and persons outside of the vehicle, such as pedestrians. One system of this type is referred to as a collision preparation system. For example, a reversible active pedestrian safety system is a collision preparation system that takes certain actions if a pre-collision sensing system on the vehicle determines that the vehicle may collide with a pedestrian. The pre-collision sensing system will typically send a control signal to automatically engage the brakes of the vehicle in the event of an imminent collision. Also, the system may raise the back of the hood of the vehicle some distance so that if the vehicle does impact the pedestrian, the pedestrian's head will hit the raised hood with more crush space that will cause less severe injuries. Further, the system may engage an active bumper system where a front bumper of the vehicle extends a certain distance to create a more favorable impact geometry and crumple zone, which will lessen the impact on the pedestrian.

The pre-collision sensing system needs to detect an imminent collision with a person or other object with enough time to deploy the hood and/or the bumper prior to impact with the pedestrian. For example, in the known system, the system must predict the collision 500 ms prior to impact to effectively deploy the bumper, and must predict the collision 200 ms prior to impact to deploy the hood. However, there may be incidents that a conventional pre-collision sensing system might be unable to make collision prediction this quickly.

SUMMARY OF THE INVENTION

In accordance with the teachings of the present invention, an algorithm is disclosed that is part of a collision preparation system that provides selective and limited vehicle braking after a high risk collision is determined by a pre-collision sensing system so as to give the system additional time to activate collision mitigation devices on the vehicle before impact with an object. If the predicted time to collision between the vehicle and the object is less than a required time to collision, which is determined by how much time is necessary for a certain collision mitigation device to be fully deployed, the algorithm calculates a time dilation deceleration that is sufficient to slow down the vehicle such that the time to collision will be equal to or slightly greater that the required time to collision. The system causes the vehicle to automatically brake to decelerate the vehicle at the time dilation deceleration until the time dilation deceleration reaches a predetermined decelerating threshold so that more time is available for the collision preparation system to determine whether to activate and/or deploy the collision mitigation device. In an alternate embodiment, the algorithm can determine whether the predicted time to collision is less than more than one required time to collision values for multiple collision mitigation devices. In an alternate embodiment, a pre-freezing stage is added to the decision process.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for providing time dilation deceleration in a potential collision situation of a vehicle with an object in order to more effectively activate crash mitigation devices on the vehicle is merely exemplary in nature, and is no way intended to limit the invention or its applications or uses.

Figure 1:
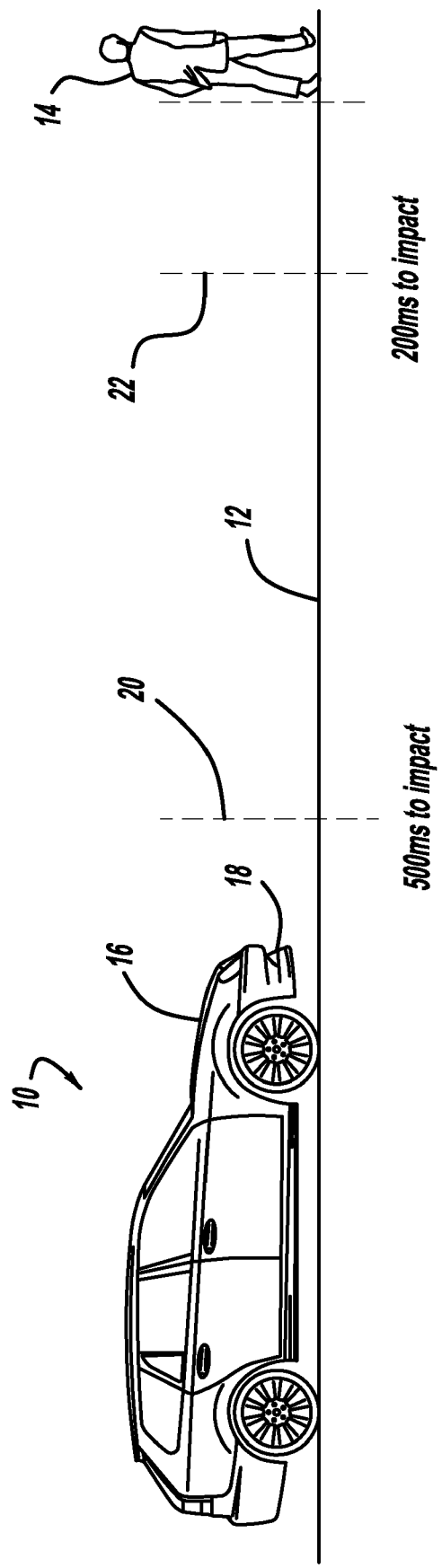
FIG. 1 is a diagram of a vehicle in relation to a pedestrian.

FIG. 1 is a representation of a vehicle 10 traveling on a roadway 12, where a pedestrian 14 is crossing the roadway 12 in front of the vehicle 10. The vehicle 10 includes a hood 16 and a bumper 18. In one embodiment, the hood 16 is equipped with an actuator that partially lifts the hood from the windshield side so that if the vehicle 10 were to collide with the pedestrian 14, the head of the pedestrian 14 would impact the raised hood 16 with more crush space that would reduce or eliminate injury. Further, the bumper 18 is extendable in that if the vehicle 10 does collide with the pedestrian 14, the extended bumper 18 creates a more favorable impact geometry and crumple zone that could lessen the impact on the pedestrian 14, also reducing the chance of injury. Crash mitigation devices of this type are known to those skilled in the art.

Known pre-collision sensing and collision mitigation systems on vehicles that employ such devices include sensors (not shown) that detect the pedestrian 14, and algorithms that process the sensor information to determine whether the brakes of the vehicle 10 should be activated to avoid a collision. If the vehicle 10 is not going to hit the pedestrian 14, then it would be undesirable to provide an intrusive high-G braking that may be uncomfortable for the passengers in the vehicle 10. In at least one known system, the system requires about 500 ms before the impact with the pedestrian 14, represented by line 20, which would depend on the speed of the vehicle 10, to adequately deploy the bumper 18. Likewise, the system would require about 200 ms prior to impact with the pedestrian 14 to deploy the hood 16.

The present invention proposes a time dilation process where selective and limited braking is caused by the pre-collision sensing system on the vehicle 10 so as to give the system more time to decide whether the hood 16 and/or the bumper 18 should be deployed because of an imminent collision. As will be discussed in further detail below, if an imminent collision is detected, the collision preparation system will calculate a time dilation deceleration for the particular vehicle speed until the vehicle speed reaches a certain deceleration threshold that essentially causes the time for the system to determine whether to deploy the bumper 18 and/or the hood 16 to be frozen for some period of time.

The required deceleration of the vehicle 10 to essentially freeze time until a collision is referred to herein as time dilation deceleration ($TDD_j$), which can be calculated as:

$$TDD_j = \frac{2[DTC_j - v_j(TTC_r)]}{(TTC_r)^2} \quad (1)$$

Where $TTC_r$ is a required time to collision, $v_j$ is the closing speed of the vehicle 10 and $DTC_j$ is the distance to the collision at time $t_j$. The required time to collision $TTC_r$ is the time specific to the particular mitigation device, such as the 500 ms for the bumper 18 or 200 ms for the hood 16.

It is noted that time to collision is essentially being frozen at time $t_j$ in the vehicle time frame because its time to collision $TTC_j$ remains constant as:

$$TTC_j = \frac{-v_j + \sqrt{v_j^2 + 2(TDD_j)(DTC_j)}}{TDD_j} = TTC_r = \text{constant} \quad (2)$$

From this, a mechanical time dilation (MTD) value can be defined as:

$$MTD = \frac{2}{(1 + v_C/v_j)} TTC'_j \quad (3)$$

Where $TTC'_j$ is the time to collision without the mechanical time dilation MTD at time $t_j$ and $v_C$ is the projected collision speed. The described time freezing phenomenon due to deceleration is referred to as mechanical time dilation MTD to highlight its similar effect as in the gravitational time dilation that time has slowed down as gravity increases.

It is noted that when the project collision speed is equal to the vehicle speed, there is no mechanical time dilation MTD, i.e., $TTC_j=TTC'_j$. Also, the lower the projected collision speed due to higher deceleration, the longer the time to collision TTC. Further, the longest possible time to collision TTC with mechanical time dilation is bounded by two times the time to collision TTC without the mechanical time dilation MTD when the projected collision speed is zero ($v_C=0$).

Figure 2:
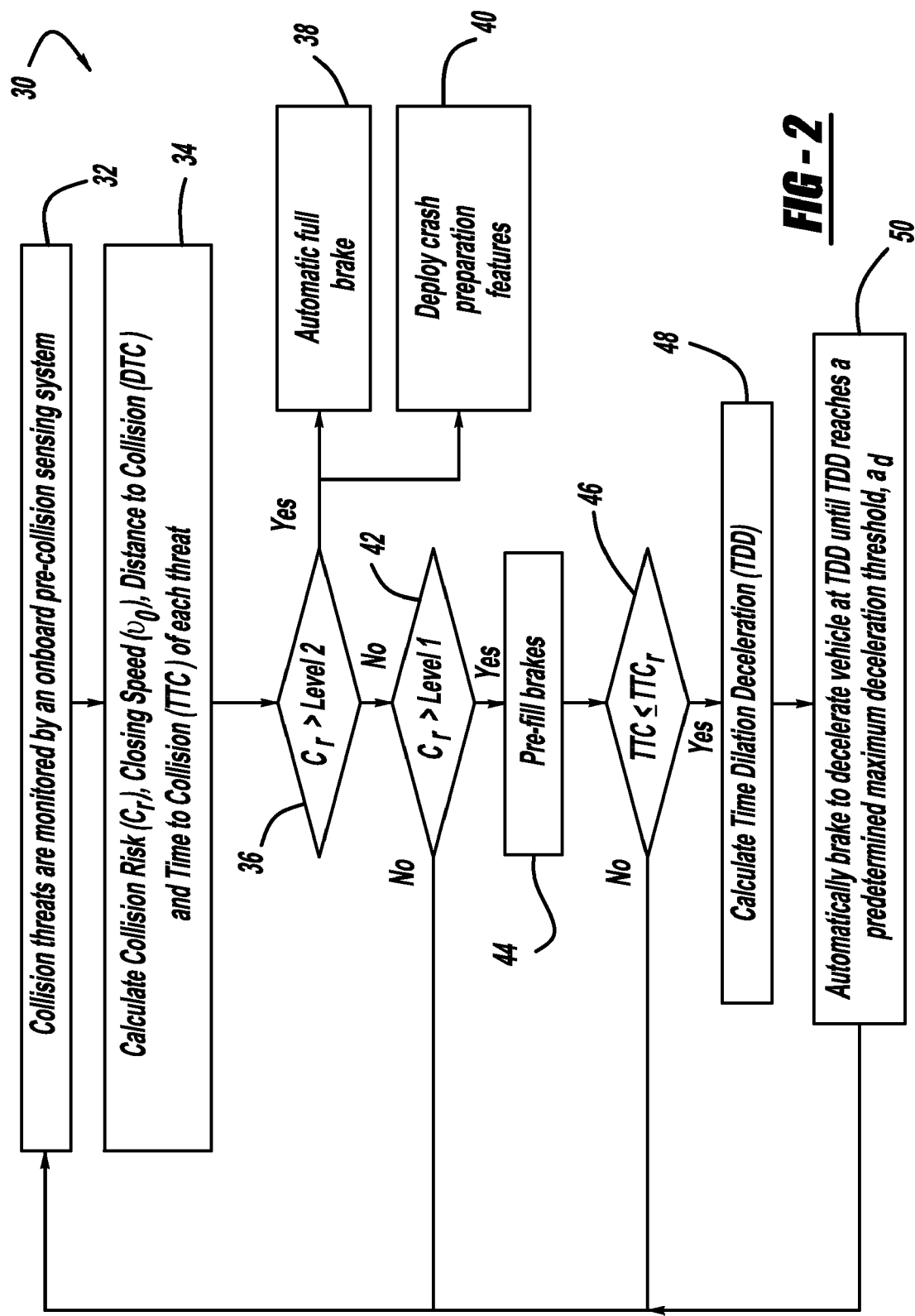
FIG. 2 is a flow chart diagram showing a process for providing time dilation deceleration to adequately activate crash mitigation devices on a vehicle, according to an embodiment of the present invention.

FIG. 2 is a flow chart diagram 30 showing a process for providing a mechanical time dilation MTD value for collision mitigation, according to an embodiment of the present invention. The collision pre-collision sensing system on the vehicle 10 monitors collision threats at box 32. If the system detects a potential collision with an object, the algorithm calculates a collision risk value $C_r$ that identifies the potential that the collision will occur, the closing speed $v_0$ of the vehicle 10 to the object, the distance to collision DTC and the time to collision TTC of the threat at box 34. Algorithms that calculate these values are well known to those skilled in the art. The algorithm then determines whether the collision risk value $C_r$ is greater than a predetermined level 2 threshold at decision diamond 36. If the collision risk value $C_r$ is greater than the level 2 threshold, meaning that a collision is imminent or very likely, then the algorithm automatically applies full braking at box 38 and deploys crash preparation features at box 40, such as the active hood 16 and the extendable bumper 18.

If the collision risk value $C_r$ is not greater than the level 2 threshold at the decision diamond 36, then the algorithm determines whether the collision risk value $C_r$ is greater than a predetermined level 1 threshold that is less than the level 2 threshold at decision diamond 42. If the collision risk value $C_r$ is not greater than the level 1 threshold at the decision diamond 42, then the algorithm returns to the box 32 to monitor collision threats. If the collision risk value $C_r$ is greater than the level 1 threshold at the decision diamond 42, meaning that the collision risk is at least substantial, then the algorithm can cause certain pre-crash devices to be activated, such as pre-filling the brakes at box 44. By pre-filling the brakes, the braking time can be reduced.

The algorithm then determines whether the time to collision TTC is less than or equal to the required time to collision $TTC_r$, which represents the required time to deploy the crash mitigation device, such as the 500 ms for extending the bumper 18 or the 200 ms for deploying the hood 16, at decision diamond 46. If the predicted time to collision TTC is greater than the required time to collision $TTC_r$, meaning that the system still has time to deploy the active hood 16 and/or the extendable bumper 18, then the algorithm returns to the box 32 to monitor the collision threats because there is still time to deploy these devices. However, if the vehicle 10 has reached the required time to collision $TTC_r$ at the decision diamond 46, then the algorithm calculates the time dilation deceleration TDD, such as by using equation (1), to freeze the time to collision so that the system has more time to determine whether to deploy the collision mitigation features at the box 40.

The algorithm then causes the vehicle brakes to be selectively and automatically applied at box 50 to decelerate the vehicle at the calculated time dilation deceleration TDD until the vehicle braking reaches a predetermined maximum deceleration threshold $a_d$, such as 0.5 g, for example, which is the maximum deceleration the algorithm will allow to increase the time to make the decision of whether to deploy the crash preparation features at the box 40. The algorithm then returns to monitoring the collision threats at the box 32. As the process cycles through, the algorithm may determine that the collision risk value $C_r$ is greater than the level 2 threshold at the decision diamond 36, where it may automatically apply full braking at the box 38 and/or deploy the crash preparation features at the box 40.

Figure 3:
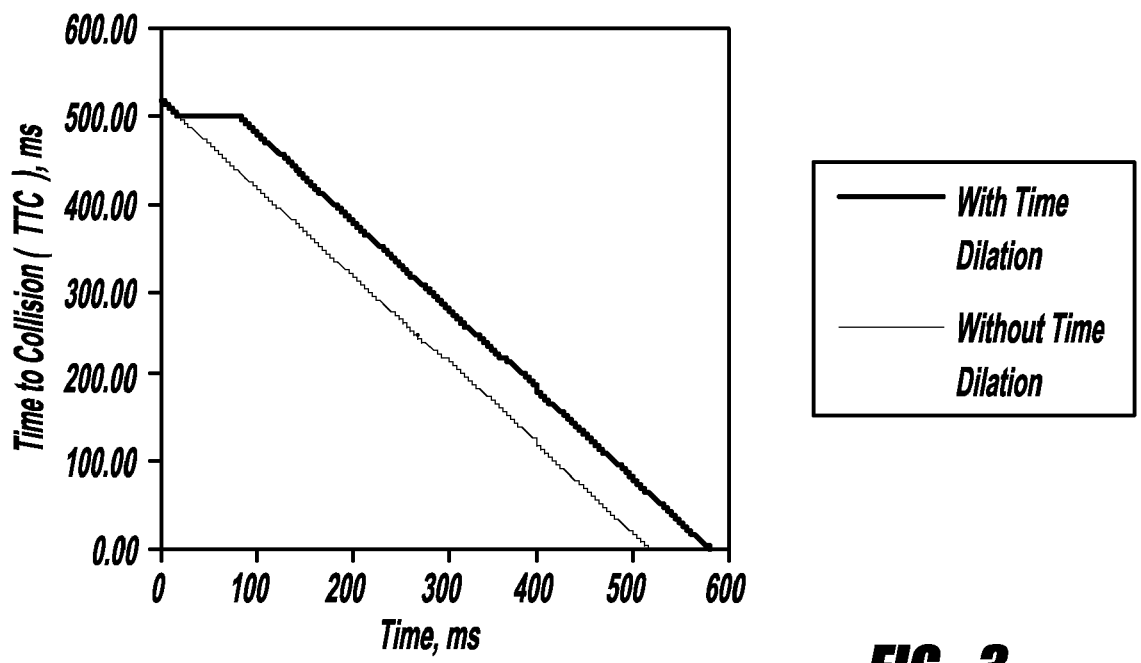
FIG. 3 is a graph with time on the horizontal axis and time to collision on the vertical axis showing an exemplary comparison between time to collision with time dilation for the process shown in the flow chart diagram of FIG. 2 and time to collision without time dilation.
Figure 4:
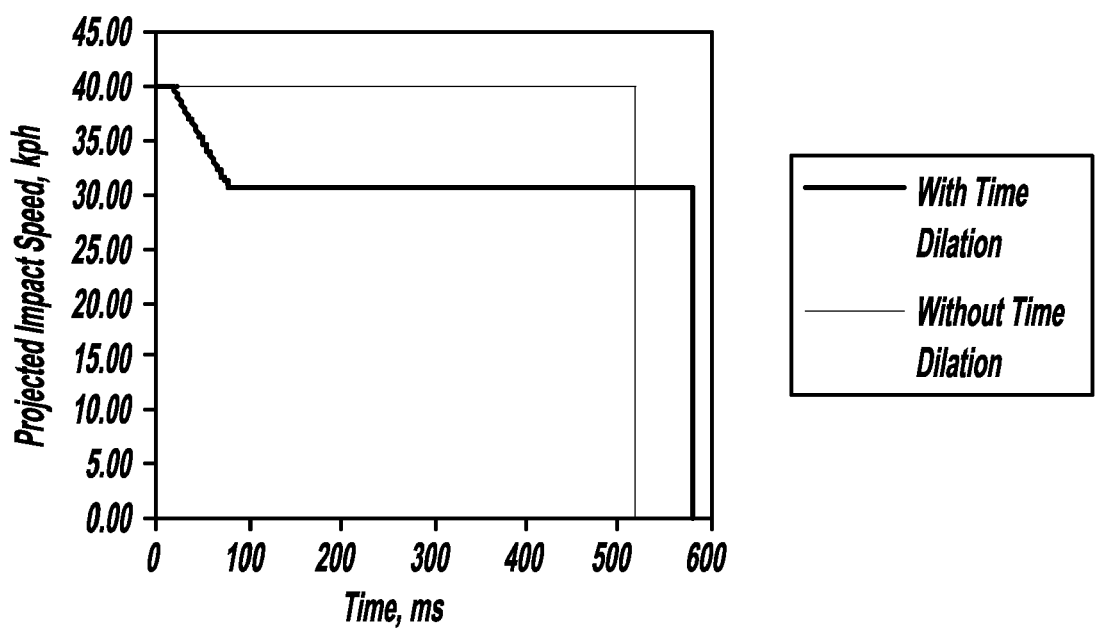
FIG. 4 is graph with time on the horizontal axis and projected impact speed on the vertical axis showing an exemplary comparison between time to collision with time dilation for the process shown in the flow chart diagram of FIG. 2 and time to collision without time dilation.
Figure 5:
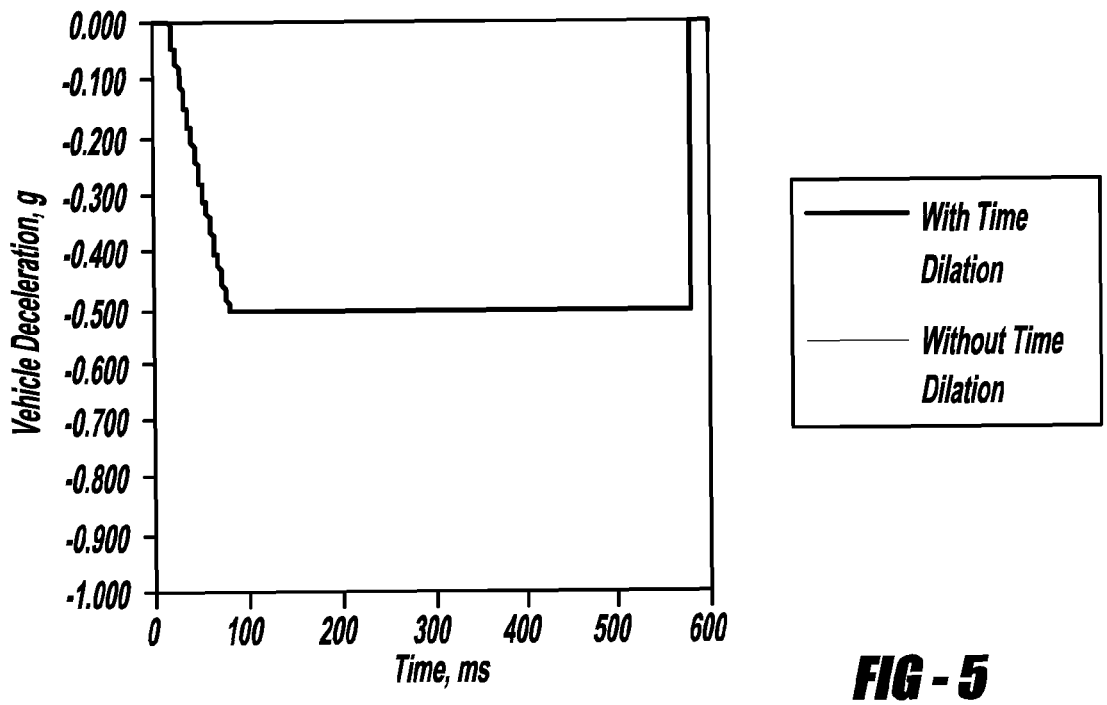
FIG. 5 is a graph with time on the horizontal axis and vehicle deceleration on the vertical axis showing an exemplary comparison between time to collision with time dilation for the process shown in the flow chart diagram of FIG. 2 and time to collision without time dilation.
Figure 6:
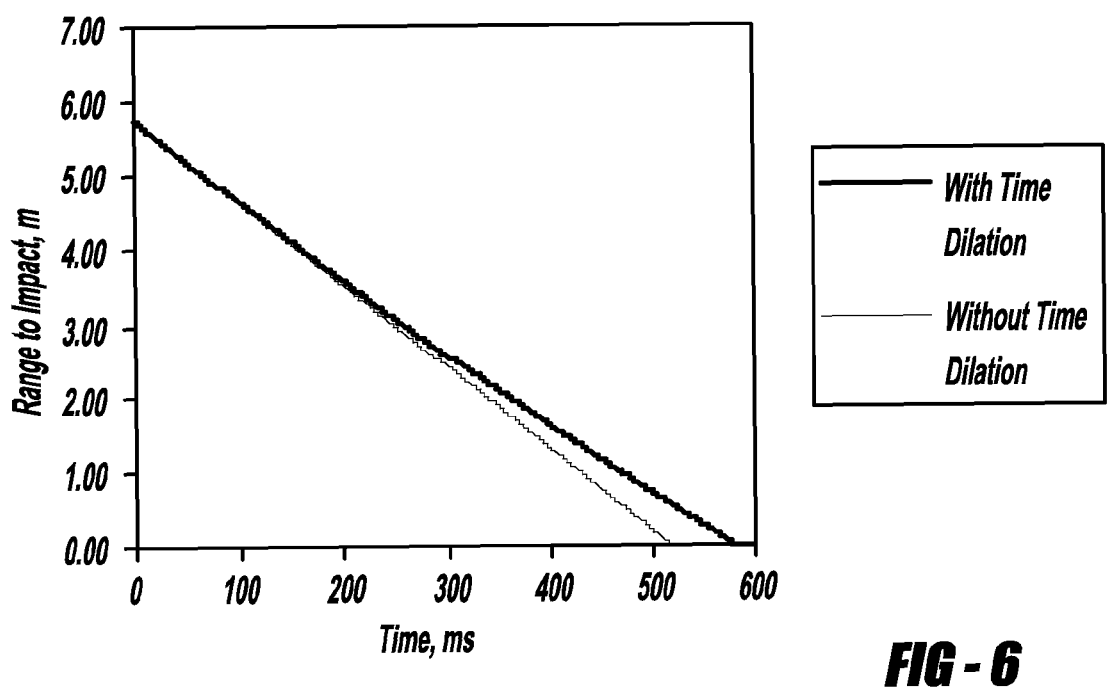
FIG. 6 is graph with time on the horizontal axis and range to impact on the vertical axis showing an exemplary comparison between time to collision with time dilation for the process shown in the flow chart diagram of FIG. 2 and time to collision without time dilation.

FIGS. 3-6 are graphs showing an example of how the process of the flow chart diagram 30 including mechanical time dilation for collision mitigation provides improvements over collision mitigation systems that do not employ time dilation. In this example, the required time to collision $TTC_r$ is 500 msec, the closing speed $v_0$ is 40 kph and the predetermined maximum deceleration threshold $a_d$ is −0.5 g. Particularly, FIG. 3 shows a comparison for time to collision TTC, FIG. 4 shows a comparison for projected impact speed, FIG. 5 shows a comparison for vehicle deceleration and FIG. 6 shows a comparison for range to impact. This example shows that there is an increased decision time of 63 ms and a reduced impact speed of 31 kph.

Figure 7:
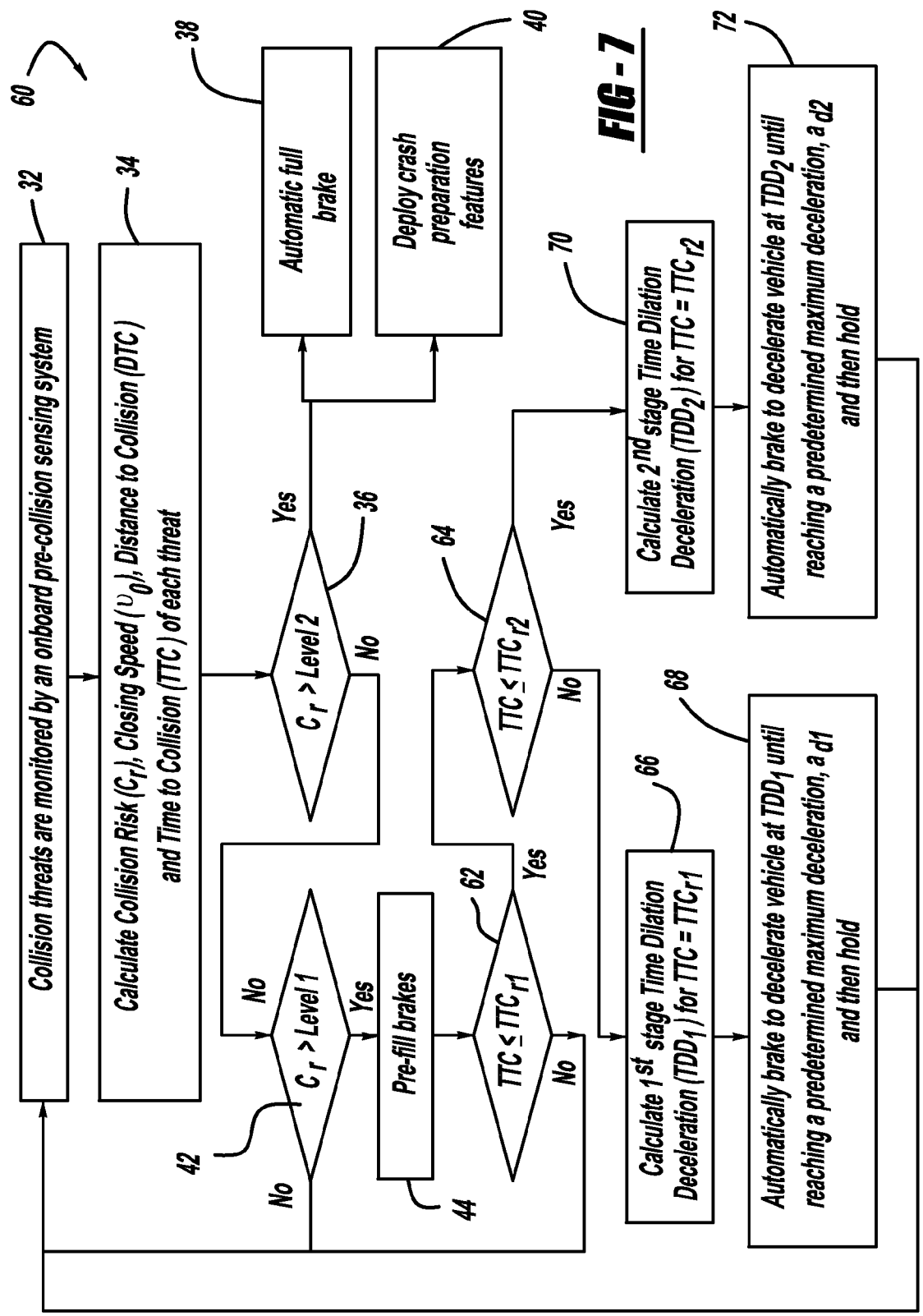
FIG. 7 is a flow chart diagram showing a process for providing time dilation deceleration to prolong the time to collision in order to adequately activate crash mitigation devices on a vehicle, according to another embodiment of the present invention.

FIG. 7 is a flow chart diagram 60 showing a process for providing multi-stage time dilation deceleration, as discussed above, where two levels of time dilation deceleration are calculated for different collision mitigation devices, such as the active hood 16 and the bumper 18, according to another embodiment of the present invention. Like steps to those of the flow chart diagram 30 are identified by the same reference numeral where the process is the same through the step of pre-filling the brakes at the box 44.

In this embodiment, there are two required time to collision values, namely $TTC_{r1}$ and $TTC_{r2}$. The algorithm determines whether the predicted time to collision TTC is less than or equal to the first required time to collision $TTC_{r1}$, which is the longer of the two times $TTC_{r1}$ and $TTC_{r2}$, at decision diamond 62 and, if not, returns to the box 32 to monitor collision threats. If yes, then the algorithm determines whether the predicted time to collision TTC is less than or equal to the second required time to collision $TTC_{r2}$ at decision diamond 64.

If the time to collision TTC is not less than or equal to the second required time to collision $TTC_{r2}$ at the decision diamond 64, then the algorithm calculates a first stage time dilation deceleration $TDD_1$ at box 66. Once the first stage time dilation deceleration $TDD_1$ is calculated, the algorithm causes the vehicle 10 to automatically brake to decelerate the vehicle 10 at the first stage time dilation deceleration $TDD_1$ until the vehicle deceleration reaches a first predetermined maximum deceleration threshold $a_{d1}$, such as 0.5 g, for example, at box 68. In this situation, the algorithm is providing time dilation for the longer of the two deployment times, such as the bumper 18, where the time to collision TTC would be between the 500 ms and the 200 ms.

The algorithm then returns to the box 32 to monitor collision threats. If the predicted time to collision TTC is less than or equal to the required time to collision $TTC_{r2}$ at the decision diamond 64, then the algorithm calculates a second stage time dilation deceleration $TDD_2$ at box 70, and then automatically brakes the vehicle 10 to decelerate the vehicle 10 at the time dilation deceleration $TDD_2$ until the vehicle braking reaches a predetermined maximum deceleration threshold $a_{d2}$, such as 0.7 g, for example, at box 72. In this situation, the time to collision TTC would be less than the 200 ms required to deploy the hood 16. The algorithm then returns to the box 32 to monitor collision threats.

Figure 8:
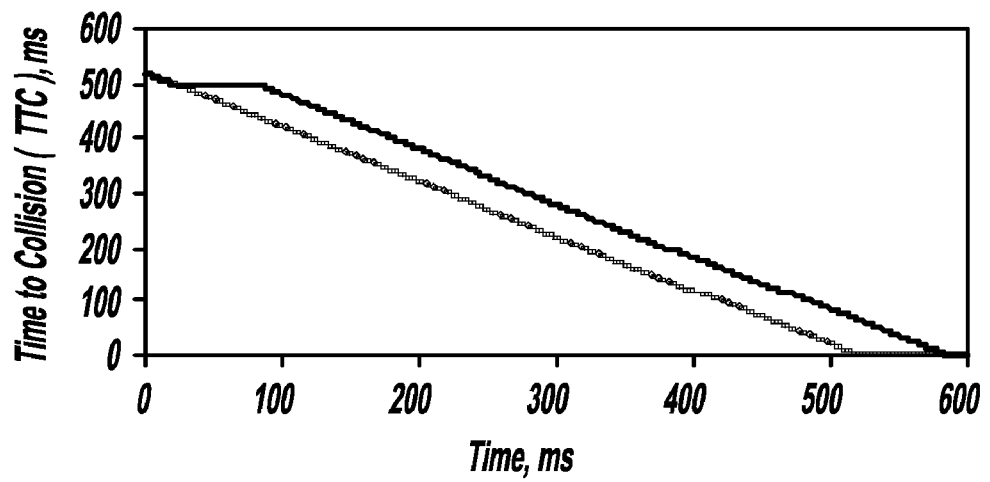
FIG. 8 is a graph with time on the horizontal axis and time to collision on the vertical axis showing an exemplary comparison between time to collision with time dilation and pre-freezing for the process shown in the flow chart diagram of FIG. 7 and time to collision without time dilation.
Figure 9:
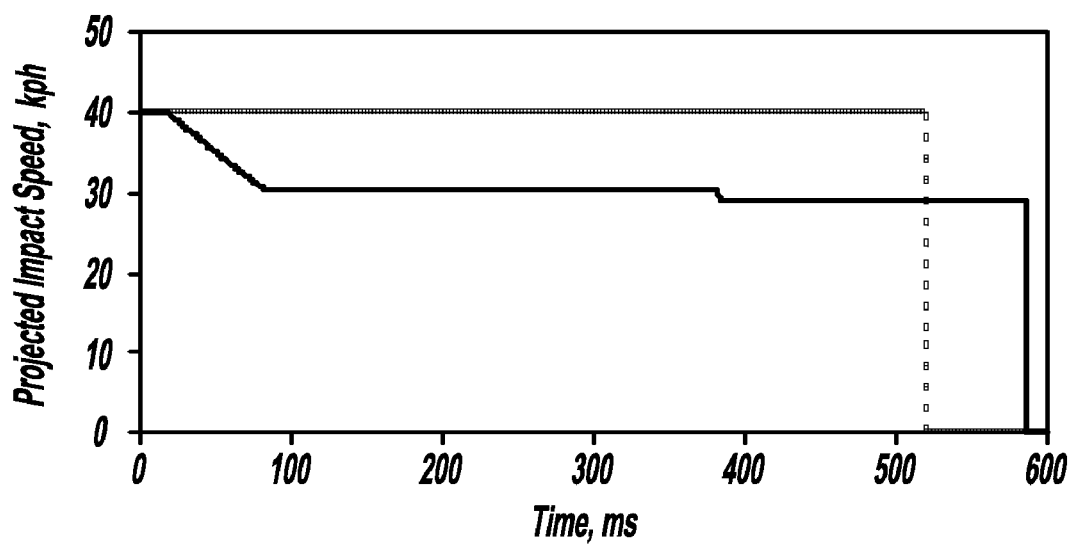
FIG. 9 is graph with time on the horizontal axis and projected impact speed on the vertical axis showing an exemplary comparison between time to collision with time dilation and pre-freezing for the process shown in the flow chart diagram of FIG. 7 and time to collision without time dilation.
Figure 10:
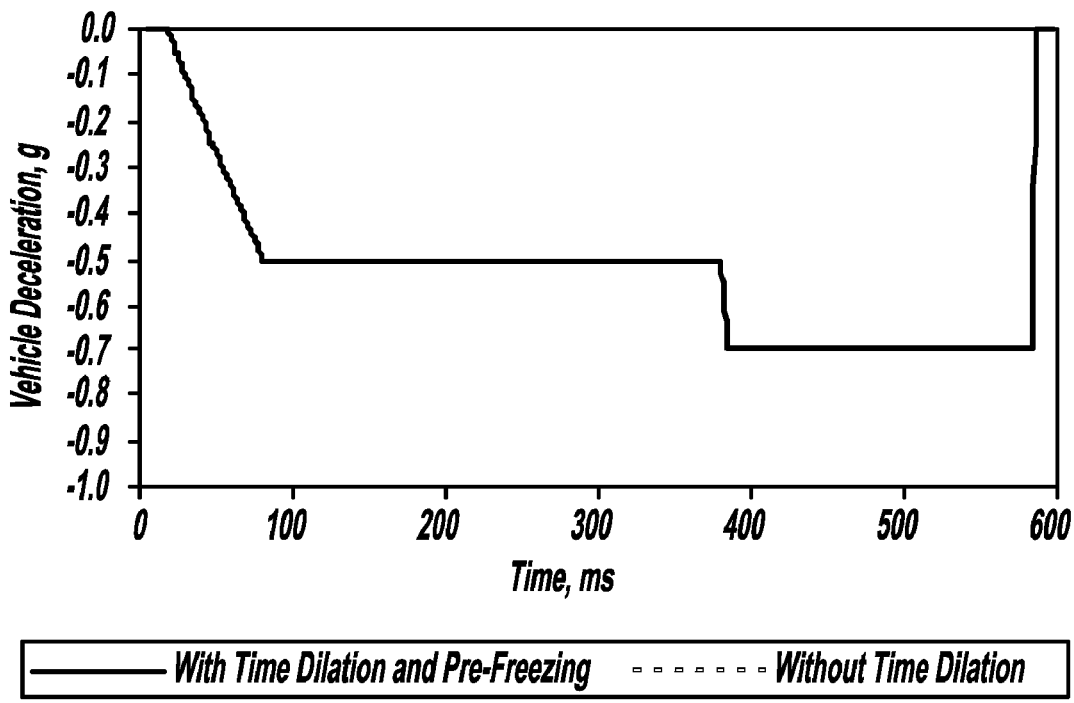
FIG. 10 is a graph with time on the horizontal axis and vehicle deceleration on the vertical axis showing an exemplary comparison between time to collision with time dilation and pre-freezing for the process shown in the flow chart diagram of FIG. 7 and time to collision without time dilation.
Figure 11:
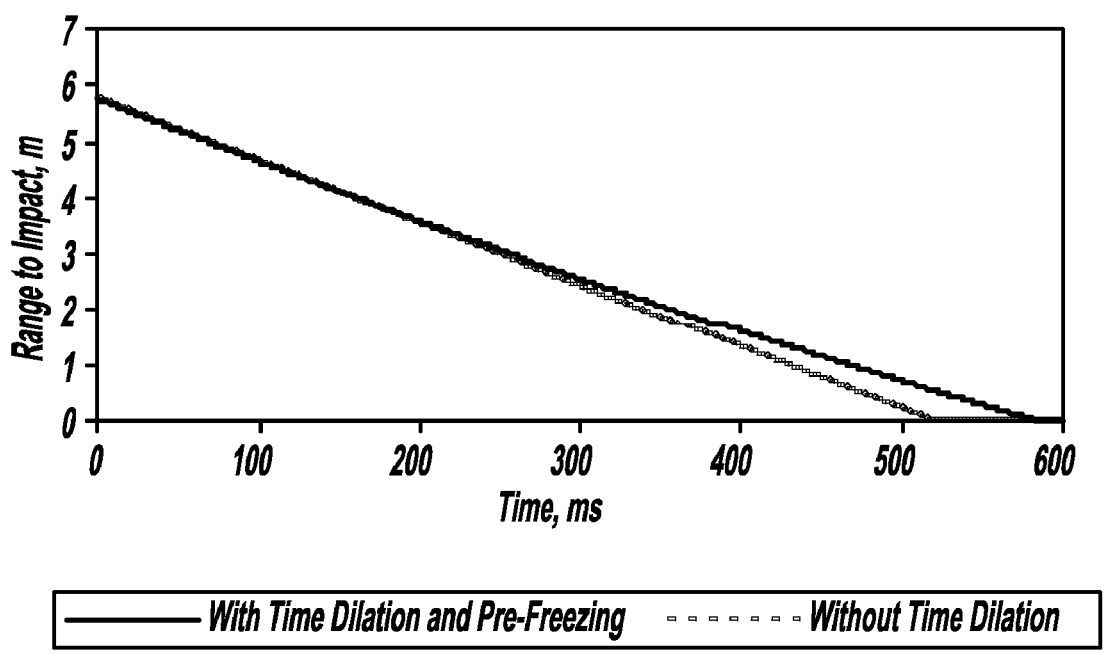
FIG. 11 is graph with time on the horizontal axis and range to impact on the vertical axis showing an exemplary comparison between time to collision with time dilation and pre-freezing for the process shown in the flow chart diagram of FIG. 7 and time to collision without time dilation.

FIGS. 8-11 are graphs showing an example of how the process of the flow chart diagram 60 including mechanical time dilation and pre-freezing for collision mitigation provides improvements over collision mitigation systems that do not employ time dilation. In this example, the first required time to collision $TTC_{r1}$ is 500 msec, the second required time to collision $TTC_{r2}$ is 200 ms, the distance to collision $DTC_0$ is 5.76 m, the closing speed $v_0$ is 40 kph, the first predetermined maximum deceleration threshold $a_{d1}$ is −0.5 g and the second predetermined maximum deceleration threshold $a_{d2}$ is −0.7 g. Particularly, FIG. 8 shows a comparison for time to collision TTC, FIG. 9 shows a comparison for projected impact speed, FIG. 10 shows a comparison for vehicle deceleration and FIG. 11 shows a comparison for range to impact. This example shows that there is an increased decision time of 68 ms and a reduced impact speed of 29 kph.

Figure 12:
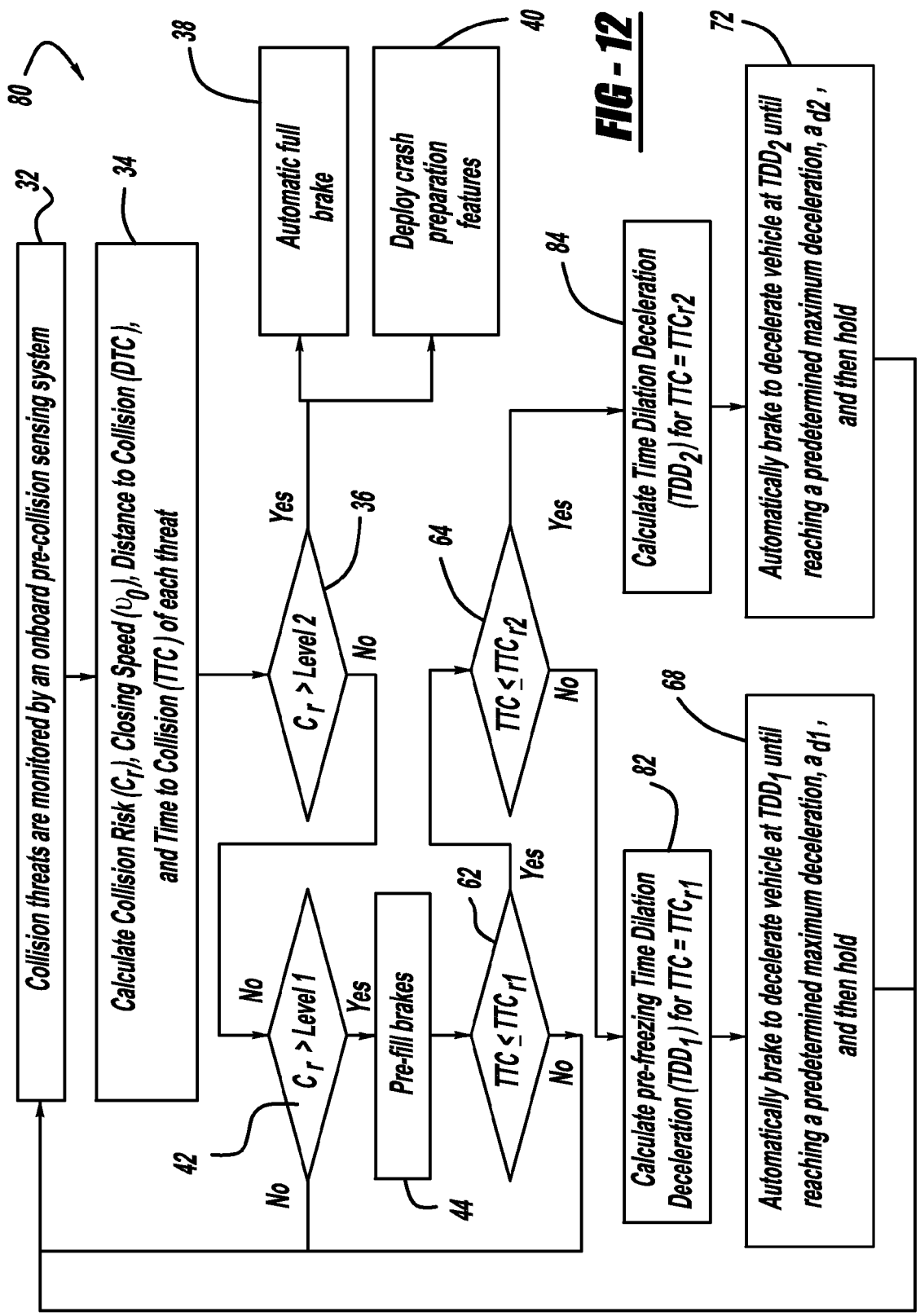
FIG. 12 is a flow chart diagram showing a process for providing time dilation deceleration to adequately activate crash mitigation devices on a vehicle, according to another embodiment of the present invention.

FIG. 12 is a flow chart diagram 80 showing a process for providing a pre-freezing time dilation deceleration on top of the process described in the flow chart diagram 30 for collision mitigation, according to another embodiment of the present invention. The steps that are the same as the flow chart diagram 60 are identified by the same reference numeral. In this embodiment, instead of calculating the first stage time dilation deceleration $TDD_1$, the algorithm calculates a pre-freezing time dilation deceleration at box 82 and box 84 to give even more time than for the process described above for the system to determine whether collision preparation techniques should be deployed.

Figure 13:
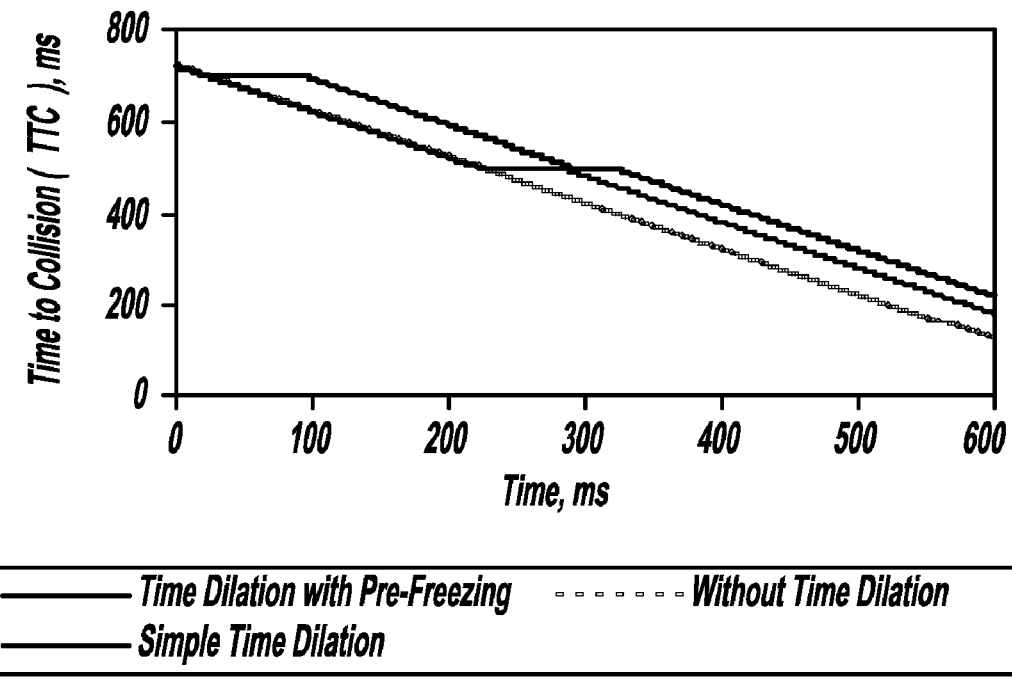
FIG. 13 is a graph with time on the horizontal axis and time to collision on the vertical axis showing an exemplary comparison between time to collision with time dilation for the process shown in the flow chart diagram of FIG. 12, time to collision without time dilation and simple time dilation.
Figure 14:
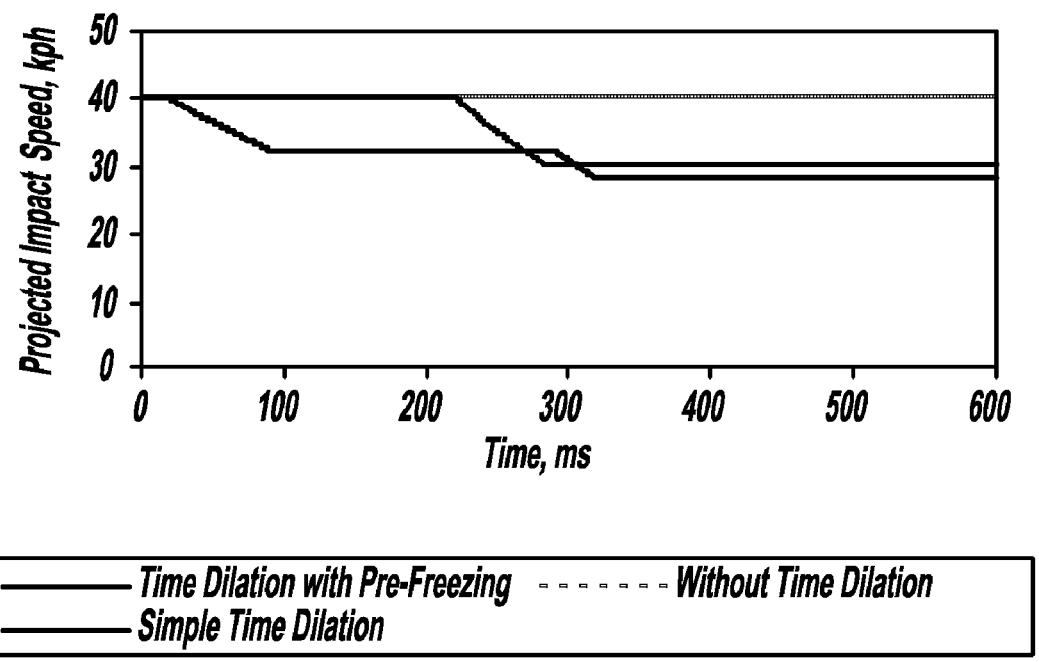
FIG. 14 is graph with time on the horizontal axis and projected impact speed on the vertical axis showing an exemplary comparison between time to collision with time dilation for the process shown in the flow chart diagram of FIG. 12, time to collision without time dilation and simple time dilation.
Figure 15:
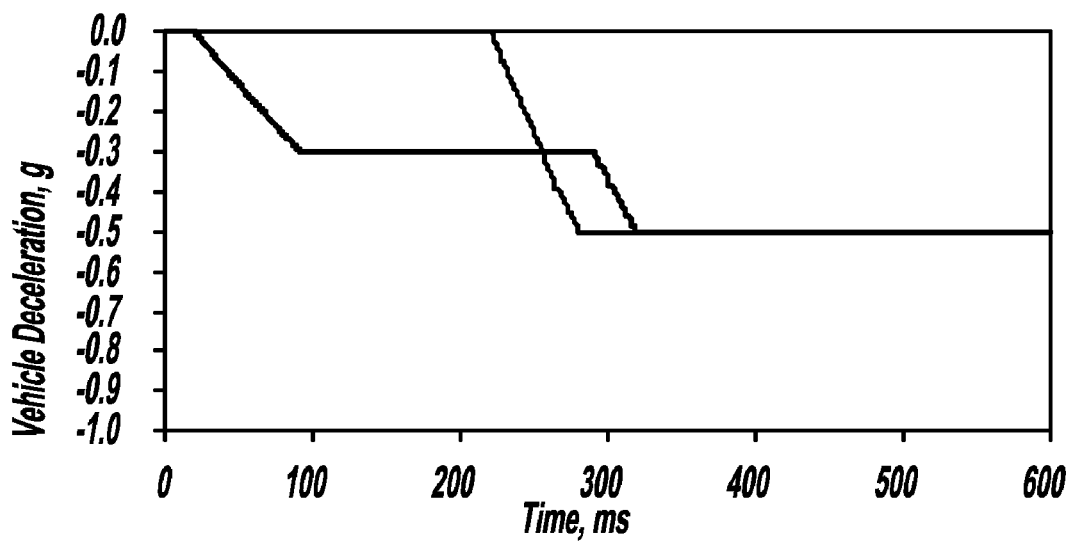
FIG. 15 is a graph with time on the horizontal axis and vehicle deceleration on the vertical axis showing an exemplary comparison between time to collision with time dilation for the process shown in the flow chart diagram of FIG. 12, time to collision without time dilation and simple time dilation.
Figure 16:
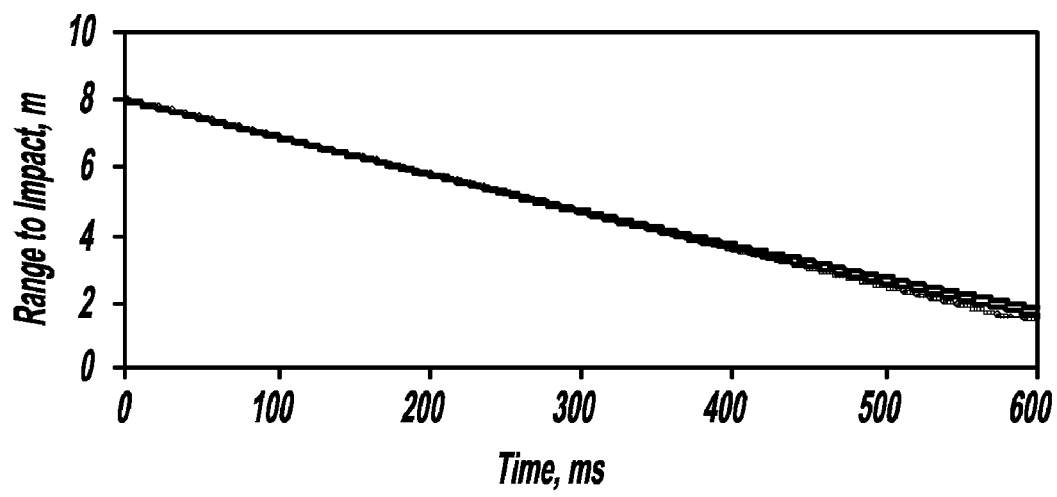
FIG. 16 is graph with time on the horizontal axis and range to impact on the vertical axis showing an exemplary comparison between time to collision with time dilation for the process shown in the flow chart diagram of FIG. 12, time to collision without time dilation and simple time dilation.

FIGS. 13-16 are graphs showing an example of how the process of the flow chart diagram 80 including mechanical time dilation for collision mitigation provides improvements over collision mitigation systems that do not employ time dilation and collision systems that provide simple time dilation, such as for FIG. 2. In this example, the first required time to collision $TTC_{r1}$ is 700 msec, the second required time to collision $TTC_{r2}$ is 500 ms, the distance to collision $DTC_0$ is 8.00 m, the closing speed $v_0$ is 40 kph, the first predetermined maximum deceleration threshold $a_{d1}$ is −0.3 g and the second predetermined maximum deceleration threshold $a_{d2}$ is −0.5 g. Particularly, FIG. 13 shows a comparison for time to collision TTC, FIG. 14 shows a comparison for projected impact speed, FIG. 15 shows a comparison for vehicle deceleration and FIG. 16 shows a comparison for range to impact. This example shows that there is an increased decision time of 102 ms and a reduced impact speed of 28 kph.

The foregoing discussion discloses and describes merely exemplary embodiments of the present invention. One skilled in the art will readily recognize from such discussion and from the accompanying drawings and claims that various changes, modifications, variations and combination of features can be made therein without departing from the spirit and scope of the invention as defined in the following claims.

What is claimed is:

1. A method for increasing the time that a vehicle has to determine whether it should deploy one or more crash preparation devices in a potential collision situation with an object, said method comprising:
    determining that there is a collision threat between the vehicle and the object;
    calculating a collision risk value based on the collision threat;
    calculating a closing speed between the vehicle and the object;
    calculating a distance to collision between the vehicle and the object;
    calculating a time to collision between the vehicle and the object;
    determining whether the collision risk value is greater than a first predetermined threshold;
    deploying predetermined crash preparation devices and/or providing automatic vehicle braking if the collision risk value is greater than the first threshold;
    determining whether the collision risk value is greater than a second predetermined threshold if the collision risk value is not greater than the first threshold;
    determining whether the time to collision is less than at least one required time to collision if the collision risk value is greater than the second threshold, where the required time to collision is the time it takes to deploy a crash preparation device;
    calculating a time dilation deceleration value that that identifies how much deceleration the vehicle needs to increase the time to make a decision to deploy the one or more crash preparation devices if the time to collision is less than the at least one required time to collision; and
    automatically braking the vehicle at the time dilation deceleration value.

2. The method according to claim 1 wherein determining whether the time to collision is less than at least one required time to collision includes determining whether the time to collision is less than a plurality of required time to collisions if the collision risk value is greater than the second threshold, where the plurality of required time to collisions is the time it takes to deploy more than one crash preparation device that have different deployment times.

3. The method according to claim 2 wherein calculating a time dilation deceleration value includes calculating a plurality of time dilation deceleration values for each required time to collision, and wherein automatically braking the vehicle at the time dilation deceleration value includes automatically braking the vehicle at the time dilation deceleration value for a particular one of the crash preparation devices.

4. The method according to claim 1 wherein deploying crash preparation devices includes raising a vehicle hood and/or extending a vehicle bumper.

5. The method according to claim 1 wherein calculating the time dilation deceleration value includes using the equation:

$$TDD_j = \frac{2[DTC_j - v_j(TTC_r)]}{(TTC_r)^2}$$

where $TDD_j$ is the time dilation deceleration value at time $t_j$, $TTC_r$ is the required time to collision, $v_j$ is the closing speed and $DTC_j$ is the distance to collision at time $t_j$.

6. The method according to claim 1 wherein automatically braking the vehicle at the time dilation deceleration value includes automatically braking the vehicle at the time dilation deceleration value until the vehicle reaches a predetermined maximum deceleration threshold.

7. The method according to claim 1 further comprising activating pre-crash devices if the time to collision is greater than the second threshold and less than the first threshold.

8. The method according to claim 7 wherein activating pre-crash devices includes pre-filling brakes.

9. A method for increasing the time that a vehicle has to determine whether it should deploy one or more crash preparation devices in a potential collision situation with an object, said method comprising:
    calculating a time to collision between the vehicle and the object;
    determining whether the time to collision is less than at least one required time to collision where the required time to collision is the time that it takes to deploy a crash preparation device;
    calculating a time dilation deceleration value that identifies how much deceleration the vehicle needs to increase the time to make a decision to deploy one or more crash preparation devices if the time to collision is less than the at least one required time to collision; and
    automatically braking the vehicle at the time dilation deceleration value.

10. The method according to claim 9 further comprising determining that there is a collision threat between the vehicle and the object, calculating a collision risk value based on the collision threat, determining whether the collision risk value is greater than a first predetermined threshold and deploying one or more crash preparation devices and/or providing automatic vehicle braking if the collision risk value is greater than the first threshold.

11. The method according to claim 10 further comprising determining whether the collision risk value is greater than a second predetermined threshold if the collision risk value is not greater than the first threshold and activating pre-crash devices if the collision risk value is between the first and second thresholds.

12. The method according to claim 9 wherein determining whether the time to collision is less than at least one required time to collision includes determining whether the time to collision is less than a plurality of required time to collisions.

13. The method according to claim 12 wherein calculating a time dilation deceleration value includes calculating a plurality of time dilation deceleration values for each required time to collision, and wherein automatically braking the vehicle at the time dilation deceleration value includes automatically braking the vehicle at the time dilation deceleration value for a particular one of the crash preparation devices.

14. The method according to claim 9 wherein deploying crash preparation devices includes raising a vehicle hood and/or extending a vehicle bumper.

15. The method according to claim 9 wherein calculating the time dilation deceleration value includes using the equation:

$$TDD_j = \frac{2[DTC_j - v_j(TTC_r)]}{(TTC_r)^2}$$

where $TDD_j$ is the time dilation deceleration value at time $t_j$, $TTC_r$ is the required time to collision, $v_j$ is the closing speed and $DTC_j$ is the distance to collision at time $t_j$.

16. A system for increasing the time that a vehicle has to determine whether it should deploy one or more crash preparation devices in a potential collision situation with an object, said system comprising:
 means for determining that there is a collision threat between the vehicle and the object;
 means for calculating a collision risk value based on the collision threat;
 means for calculating a closing speed between the vehicle and the object;
 means for calculating a distance to collision between the vehicle and the object;
 means for calculating a time to collision between the vehicle and the object;
 means for determining whether the collision risk value is greater than a first predetermined threshold;
 means for deploying predetermined crash preparation devices and/or providing automatic vehicle braking if the collision risk value is greater than the first threshold;
 means for determining whether the collision risk value is greater than a second predetermined threshold if the collision risk value is not greater than the first threshold;
 means for determining whether the time to collision is less than at least one required time to collision if the collision risk value is greater than the second threshold, where the required time to collision is the time it takes to deploy a crash preparation device;
 means for calculating a time dilation deceleration value that identifies how much deceleration the vehicle needs to increase the time to make a decision to employ the one or more crash preparation devices if the time to collision is less than the at least required time to collision; and
 means for automatically braking the vehicle at the time dilation deceleration value.

17. The system according to claim 16 wherein the means for determining whether the time to collision is less than at least one required time to collision determines whether the time to collision is less than a plurality of required time to collisions if the collision risk value is greater than the second threshold, where the plurality of required time to collisions is the time it takes to deploy more than one crash preparation device that have different deployment times.

18. The system according to claim 17 wherein the means for calculating a time dilation deceleration value calculates a plurality of time dilation deceleration values for each required time to collision, and wherein automatically braking the vehicle at the time dilation deceleration value includes automatically braking the vehicle at the time dilation deceleration value for a particular one of the crash preparation devices.

19. The system according to claim 16 wherein the means for deploying crash preparation devices raises a vehicle hood and/or extends a vehicle bumper.

20. The system according to claim 16 wherein the means for calculating the time dilation deceleration value uses the equation:

$$TDD_j = \frac{2[DTC_j - v_j(TTC_r)]}{(TTC_r)^2}$$

where $TDD_j$ is the time dilation deceleration value at time $t_j$, $TTC_r$ is the required time to collision, $v_j$ is the closing speed and $DTC_j$ is the distance to collision at time $t_j$.

21. The system according to claim 16 further comprising means for activating pre-crash devices that activates the pre-crash devices if the time to collision is greater than the second threshold and less than the first threshold.

22. The system according to claim 21 wherein the means for activating pre-crash devices pre-fills brakes.

\* \* \* \* \*